(12) United States Patent
Nakagawa et al.

(10) Patent No.: US 12,542,470 B2
(45) Date of Patent: Feb. 3, 2026

(54) DRIVE MOTOR MODULE

(71) Applicant: NIDEC CORPORATION, Kyoto (JP)

(72) Inventors: Ayumi Nakagawa, Kyoto (JP); Hiroki Akaishi, Kyoto (JP); Yusuke Makino, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 226 days.

(21) Appl. No.: 18/547,506

(22) PCT Filed: Jun. 9, 2021

(86) PCT No.: PCT/JP2021/021982
§ 371 (c)(1),
(2) Date: Aug. 23, 2023

(87) PCT Pub. No.: WO2022/180873
PCT Pub. Date: Sep. 1, 2022

(65) Prior Publication Data
US 2024/0136886 A1 Apr. 25, 2024
US 2024/0235319 A9 Jul. 11, 2024

(30) Foreign Application Priority Data
Feb. 25, 2021 (JP) .................................. 2021-029290

(51) Int. Cl.
*H02K 11/33* (2016.01)
*H02K 5/06* (2006.01)
*H02K 5/24* (2006.01)
*H05K 5/03* (2006.01)

(52) U.S. Cl.
CPC .............. *H02K 5/24* (2013.01); *H02K 11/33* (2016.01)

(58) Field of Classification Search
CPC . H05K 5/03; H02K 11/33; H02K 5/06; H02K 5/069; H02K 5/03; H02K 5/24; H02M 7/00
(Continued)

(56) References Cited

U.S. PATENT DOCUMENTS 8,443,777 B2 * 5/2013 Enokida ............. F01M 11/0004
184/106
8,853,896 B2 * 10/2014 Morisaki .................. H02K 9/14
310/89
(Continued)

FOREIGN PATENT DOCUMENTS

JP 2013-177827 * 9/2013 .............. F04B 39/00
JP 2013177826 A 9/2013
(Continued)

OTHER PUBLICATIONS

International Search Report in PCT/JP2021/021982, mailed Aug. 10, 2021. 4pp.

*Primary Examiner* — Burton S Mullins
(74) *Attorney, Agent, or Firm* — HAUPTMAN HAM, LLP

(57) ABSTRACT

For example, a drive motor module capable of suppressing resonance of an inverter cover due to vibration from a motor or the like is provided. A drive motor module 1 includes a motor, an inverter electrically connected to the motor, a housing that houses the motor and the inverter, and an inverter cover that has a plate shape and covers the inverter. An outer surface of an inverter cover is divided into a first region and a second region in plan view. In the first region, a plurality of first ribs arranged in parallel to each other and a connecting portion extending in a direction intersecting with the first rib and connected to one end side of each of the first ribs are provided in a protruding manner. In the second
(Continued)

region, a plurality of second ribs that radially extend are provided in a protruding manner.

14 Claims, 7 Drawing Sheets

(58) Field of Classification Search
USPC .................................. 165/80.3; 361/679.01
See application file for complete search history.

(56) References Cited

U.S. PATENT DOCUMENTS

| | | | |
|---|---|---|---|
| 9,461,580 B2* | 10/2016 | Inaba | ........................ H02S 40/34 |
| 9,929,618 B2* | 3/2018 | Hattori | ..................... F04B 39/00 |
| 10,119,542 B2 | 11/2018 | Kang et al. | |
| 2015/0061422 A1* | 3/2015 | Nagao | .................... H02M 7/003 |
| | | | 310/68 D |
| 2019/0334448 A1* | 10/2019 | Ishikawa | ................. H02K 11/33 |
| 2020/0106321 A1* | 4/2020 | Homma | ................... H02K 1/278 |
| 2022/0337134 A1* | 10/2022 | Ogasawara | ............... H02K 5/24 |

FOREIGN PATENT DOCUMENTS

| | | | | |
|---|---|---|---|---|
| JP | 2014166031 A | | 9/2014 | |
| JP | 2015126640 A | * | 7/2015 | ............... H02M 7/48 |
| JP | 2016092967 A | * | 5/2016 | ............. H02M 3/155 |
| JP | 7195541 | * | 12/2022 | ............... F04C 29/06 |
| KR | 20200137362 A | * | 12/2020 | ............... H02M 7/00 |

* cited by examiner

DRIVE MOTOR MODULE

CROSS-REFERENCE TO RELATED APPLICATIONS

This is the U.S. national stage of application No. PCT/JP2021/021982, filed on Jun. 9, 2021, and priority under 35 U.S.C. § 119(a) and 35 U.S.C. § 365(b) is claimed from Japanese Patent Application No. 2021-029290, filed on Feb. 25, 2021.

FIELD OF THE INVENTION

The present invention relates to a drive motor module.

BACKGROUND

An in-vehicle electric compressor is known. The electric compressor described above includes a housing in which an electric motor is accommodated, and an inverter housing portion in which an inverter device that supplies drive power to the electric motor is accommodated.

The inverter housing portion includes an inverter cover having a plate shape and fixed by screwing. The inverter cover may resonate with the driving of the inverter device to cause a drum phenomenon, that is, the inverter cover may vibrate (single vibration) in the thickness direction. The inverter cover generates noise depending on the degree of vibration.

Therefore, in the electric compressor described above, a plurality of ribs are formed on the inverter cover in order to suppress vibration of the inverter cover.

However, a plurality of types of arrangement modes of the ribs is conventionally known, but there is no indication that vibration can be sufficiently suppressed in any of the plurality of types of arrangement modes depending on vibration conditions.

SUMMARY

One aspect of an exemplary drive motor module of the present invention includes: a motor; an inverter electrically connected to the motor; a housing that houses the motor and the inverter; and an inverter cover that has a plate shape and covers the inverter. An outer surface of the inverter cover is divided into at least a first region and a second region in plan view. A plurality of first ribs arranged in parallel to each other and a connecting portion extending in a direction intersecting with the first ribs and connected to one end side of each of the first ribs are provided in a protruding manner in the first region. A plurality of second ribs that radially extend are provided in a protruding manner in the second region.

The above and other elements, features, steps, characteristics and advantages of the present disclosure will become more apparent from the following detailed description of the preferred embodiments with reference to the attached drawings.

DETAILED DESCRIPTION

Figure 1:
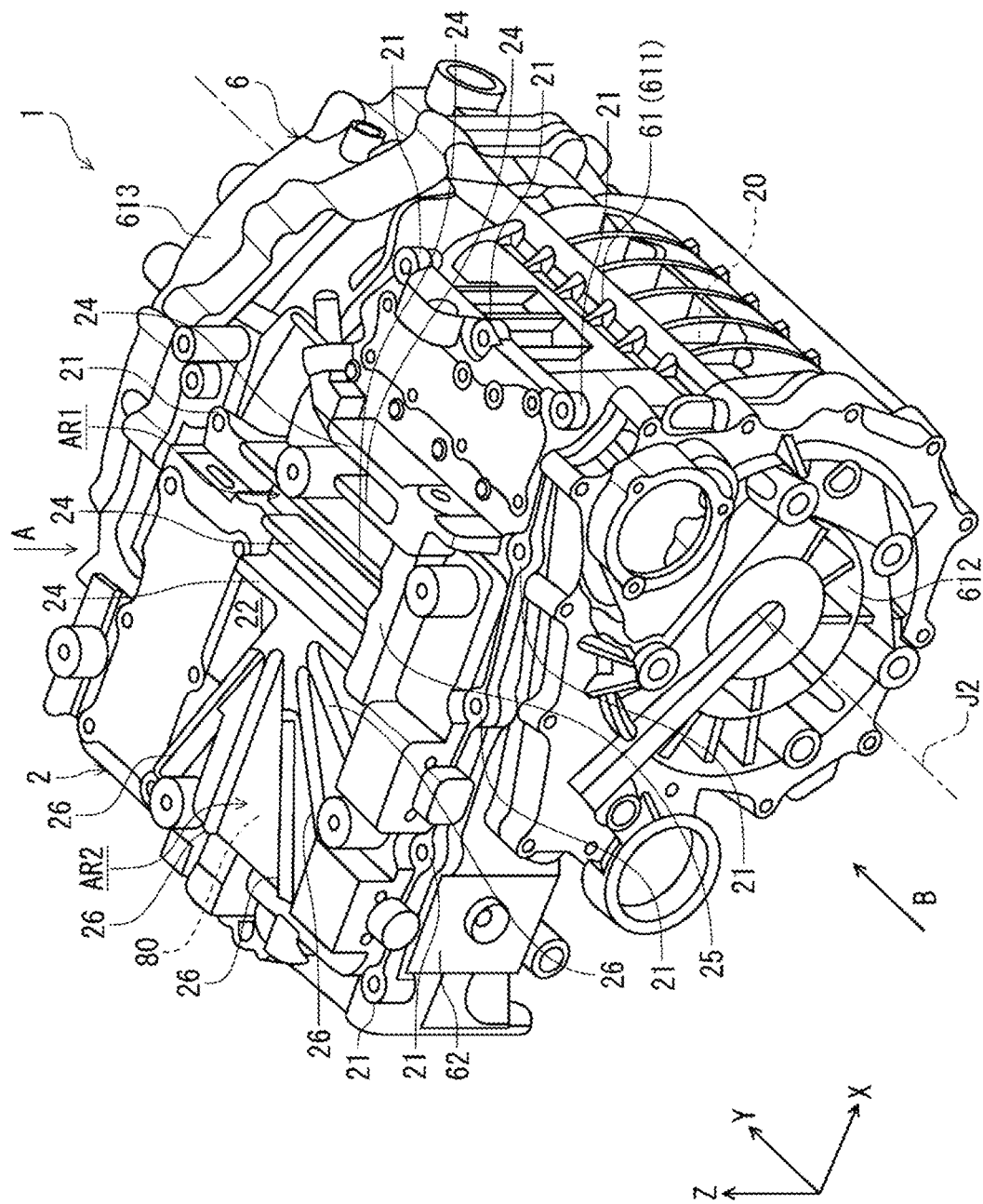
FIG. 1 is a perspective view of an embodiment of a drive motor module of the present invention.

Hereinafter, a drive motor module of the present invention will be described with reference to FIGS. 1 to 7 in detail based on a preferred embodiment shown in the accompanying drawings.

In the following description, the gravity direction is defined based on the positional relationship when the drive motor module is mounted on a vehicle located on a horizontal road surface. In addition, in the drawings, an XYZ coordinate system is shown appropriately as a three-dimensional orthogonal coordinate system. In the XYZ coordinate system, a Z-axis direction corresponds to a vertical direction (i.e., an up-down direction), and a +Z direction points upward (i.e., in a direction opposite to the direction of gravity), while a −Z direction points downward (i.e., in the direction of gravity). The X-axis direction is a direction orthogonal to the Z-axis direction and indicates a front-rear direction of the vehicle on which a drive motor module 1 is mounted. A Y-axis direction is a direction orthogonal to both the X-axis direction and the Z-axis direction, and is a width direction (left-right direction) of the vehicle.

In the following description, unless otherwise specified, a direction (the Y-axis direction) parallel to a motor axis of a motor will be simply referred to by the term "axial direction", "axial", or "axially", radial directions centered on the motor axis will be simply referred to by the term "radial direction", "radial", or "radially", and a circumferential direction centered on the motor axis, i.e., a circumferential direction about the motor axis, will be simply referred to by the term "circumferential direction", "circumferential", or "circumferentially". In the present embodiment, "one axial direction side" is a positive side in the Y-axis direction, and "the other axial direction side" is a negative side in the Y-axis direction.

In the present specification, "extending (provided) along" a predetermined direction (or plane) includes not only extending strictly in the predetermined direction but also extending in a direction inclined within a range of less than 45° with respect to the strict predetermined direction.

Figure 2:
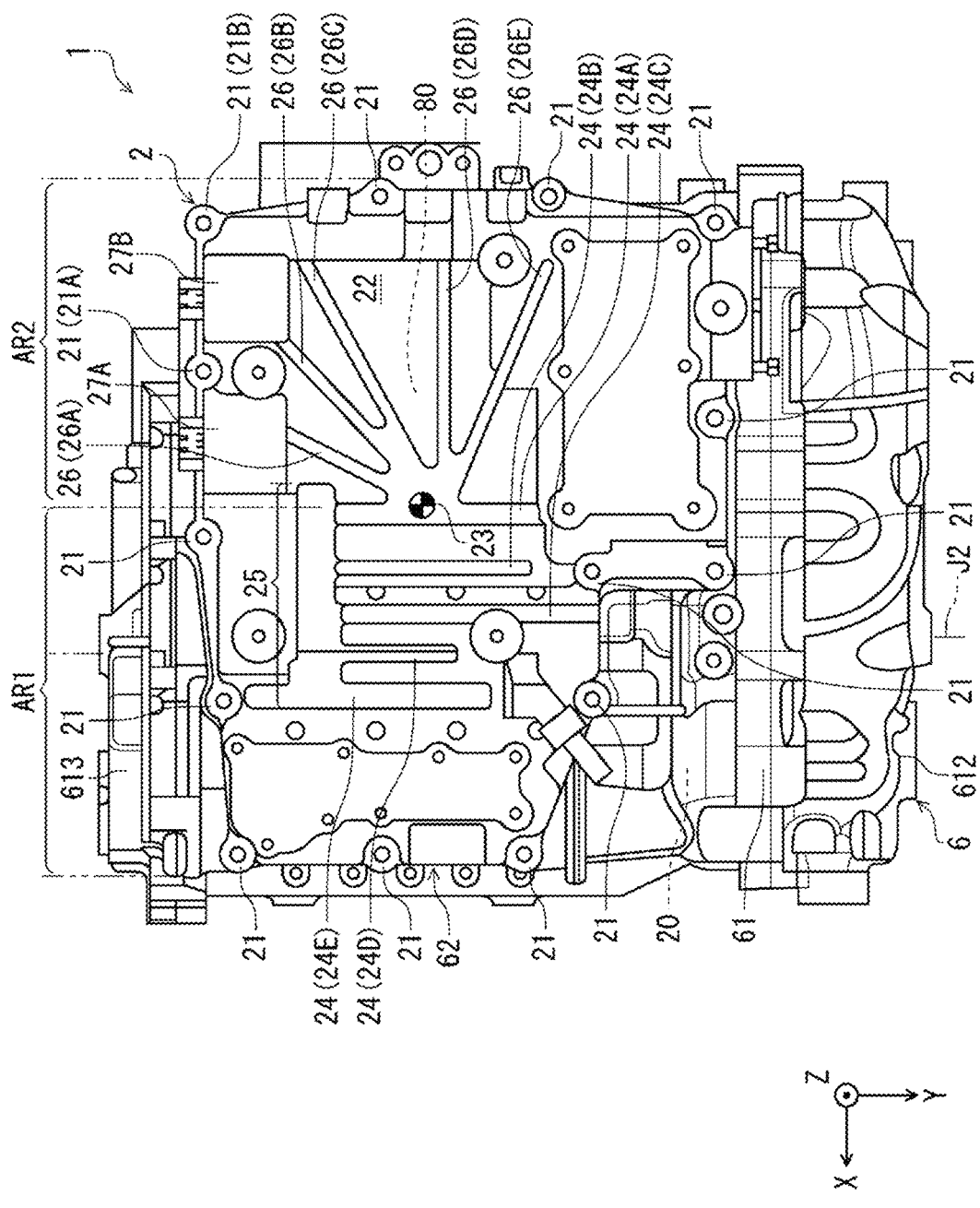
FIG. 2 is a view (plan view) when viewed from a direction of an arrow A in FIG. 1.

A drive motor module 1 illustrated in FIGS. 1 and 2 is mounted on a vehicle using a motor as a power source, such as a hybrid electric vehicle (HEV), a plug-in hybrid electric vehicle (PHV), or an electric vehicle (EV), and is used as the power source. That is, the drive motor module 1 is a drive device.

The drive motor module 1 includes a motor (main motor) 20, an inverter 80, a housing 6, and an inverter cover 2. The drive motor module 1 further includes a deceleration device, a differential device, an oil pump (none of which are illustrated), and the like.

Figure 3:
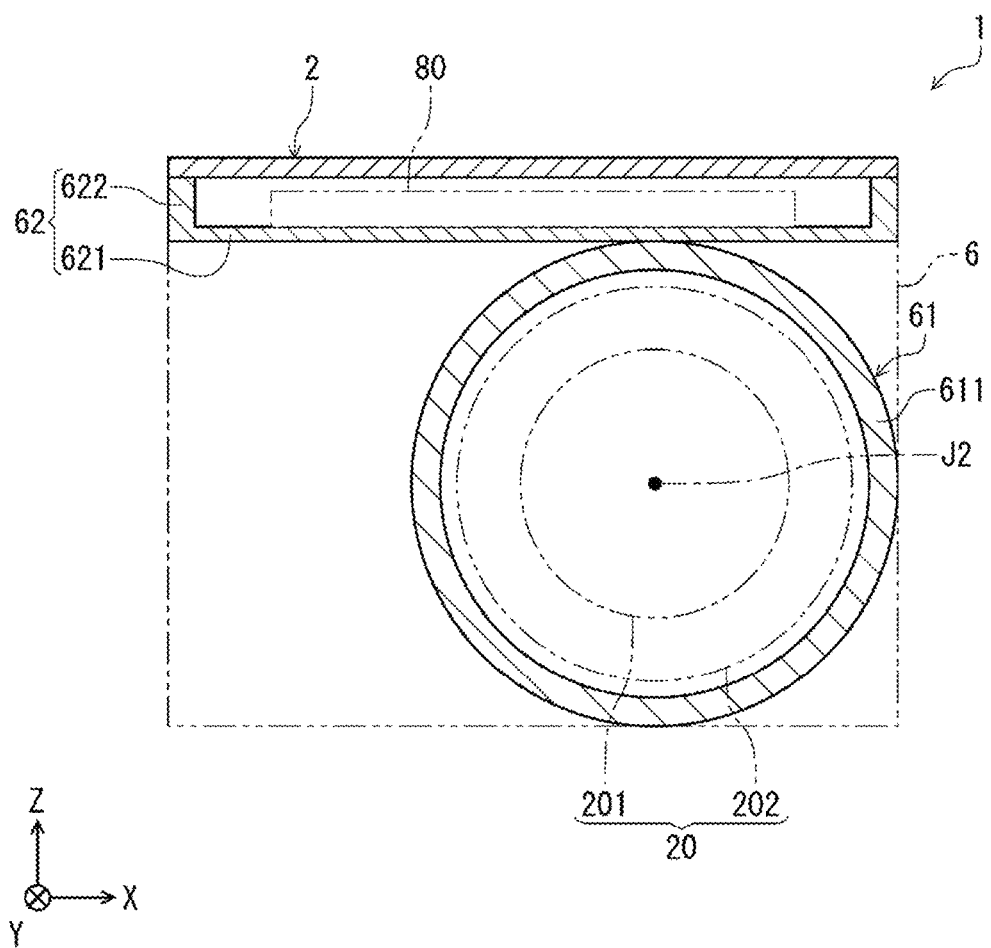
FIG. 3 is a schematic diagram (schematic sectional view) illustrating a positional relationship between a motor housing portion and an inverter housing portion when viewed from a direction of an arrow B in FIG. 1.

As illustrated in FIG. 3, the motor 20 is accommodated (housed) in the housing 6. The motor 20 includes a rotor 201 that rotates about a motor axis (axis) J2 extending in the horizontal direction, and a stator 202 located radially outside the rotor 201. The motor 20 of the present embodiment is an inner-rotor motor.

The rotor 201 rotates when an alternating current is supplied from a battery (not illustrated) to the stator 202 using the inverter 80. The rotor 201 includes a shaft, a rotor core, and a plurality of rotor magnets (all not illustrated), and rotates about the motor axis J2 extending in the horizontal direction and the width direction of the vehicle. Further, in the present embodiment, the motor axis J2 is parallel to the Y direction.

Oil as a refrigerant circulates inside the motor 20. The motor 20 is thus cooled. The oil is circulated by the operation of the oil pump.

A deceleration device is connected to the rotor 201 of the motor 20. The deceleration device has a function of reducing a rotation speed of the motor 20 to increase torque output from the motor 20 according to a reduction ratio. The deceleration device transfers the torque outputted from the motor 20 to the differential device.

The differential device is connected to the motor 20 via the deceleration device. The differential device is a device for transferring the torque outputted from the motor 20 to wheels of the vehicle. The differential device is coupled to the axle. The differential device has a function of transferring the same torque to axles of left and right wheels while absorbing a difference in speed between the left and right wheels when the vehicle is turning.

As in the motor 20, the inverter 80 is also accommodated in the housing 6. The inverter 80 is electrically connected to the motor 20. The inverter 80 includes a control element that controls power supplied to the motor 20. The control element is, for example, an IGBT.

As illustrated in FIG. 3, the housing 6 includes a motor housing portion (motor housing) 61 that houses the motor 20, and an inverter housing portion (inverter housing) 62 that houses the inverter 80.

The housing 6 is an integrally molded product in which a motor housing portion 61 and an inverter housing portion 62 are integrated. Further, the motor housing portion 61 and the inverter housing portion 62 may be configured as separate bodies, and the separate bodies may be connected to each other.

In addition, as for the positional relationship between the motor housing portion 61 and the inverter housing portion 62, in the present embodiment, as illustrated in FIG. 3, the motor housing portion 61 is located on the lower side, and the inverter housing portion 62 is located on the upper side. The positional relationship between the motor housing portion 61 and the inverter housing portion 62 is not limited to the positional relationship illustrated in FIG. 3.

The motor housing portion 61 has a cylindrical wall portion 611 that surrounds the motor 20 around the motor axis J2. In addition, as illustrated in FIGS. 1 and 2, the motor housing portion 61 has a wall portion 612 that closes the wall portion 611 from the −Y direction and a wall portion 613 that closes the wall portion 611 from the +Y direction. The motor 20 can be housed in a space surrounded by the wall portion 611, the wall portion 612, and the wall portion 613.

The inverter housing portion 62 expands in the horizontal direction and has a flat outer shape. The inverter housing portion 62 has a bottom portion 621 and a sidewall portion 622.

The inverter 80 is placed on the bottom portion 621. Further, the inverter 80 is fixed to the bottom portion 621 by, for example, screwing or the like.

The sidewall portion 622 is provided along an edge portion of the bottom portion 621. The sidewall portion 622 can laterally surround the inverter 80.

An inverter cover 2 that has a plate shape (for example, a thickness of 3 mm) is detachably attached to the upper side of the inverter housing portion 62. As illustrated in FIG. 1, the inverter cover 2 can cover the inverter 80 in a state of being attached to the inverter housing portion 62. Accordingly, the inverter 80 can be protected. In addition, for example, it is possible to prevent a person from accidentally touching the inverter 80, and it is possible to ensure safety for a person.

The inverter cover 2 is made of aluminum, for example, and is manufactured by using die casting.

In addition, the inverter cover 2 has a plurality of coupling portions 21 coupled to the inverter housing portion 62 (housing 6) at the edge portion thereof. The plurality of coupling portions 21 is disposed at intervals along the edge portion of the inverter cover 2. In addition, the vicinity of each coupling portion 21 is a portion having a relatively large thickness in the inverter cover 2.

Figure 4:
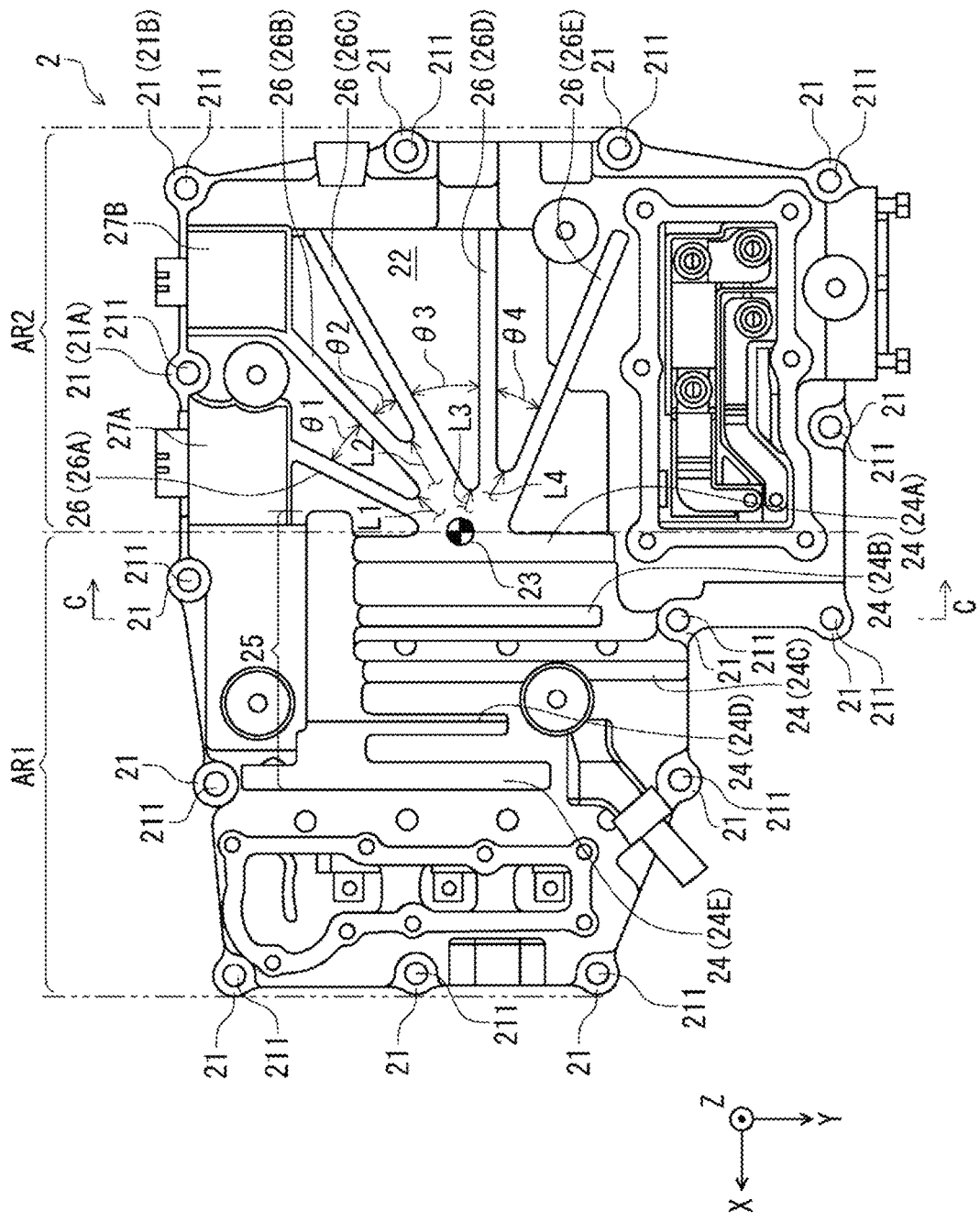
FIG. 4 is a plan view of an inverter cover included in the drive motor module illustrated in FIG. 1.

As illustrated in FIG. 4, each coupling portion 21 is provided with a through hole 211. Then, a bolt 11 (see FIG. 6) is inserted into the through hole 211, and the bolt 11 can be fastened to a screw hole (female screw) provided in the sidewall portion 622 of the inverter housing portion 62. As a result, the inverter cover 2 can be fixed to the inverter housing portion 62, and thus the inverter cover 2 can be prevented from falling off from the inverter housing portion 62. As a result, the attached state of the inverter cover 2 is stably maintained.

As described above, the motor 20 is mounted on the drive motor module 1. When the motor 20 operates, vibration also occurs accordingly. This vibration is transmitted to the inverter cover 2 via the housing 6. Depending on the vibration frequency at this time, the inverter cover 2 may resonate.

Figure 6:
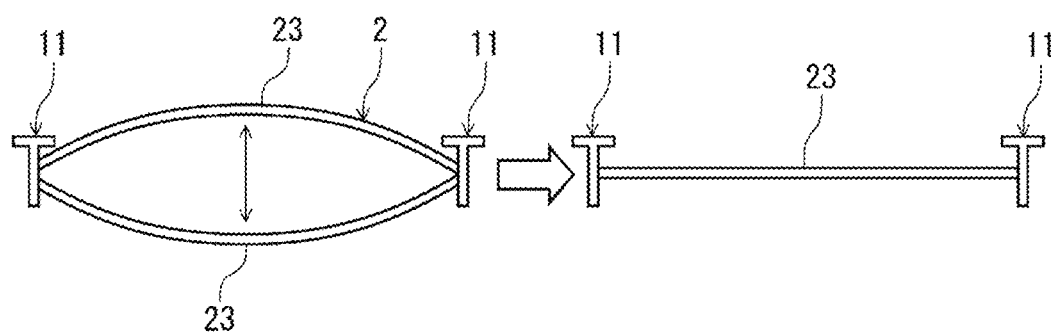
FIG. 6 is a schematic diagram illustrating a resonance state of the inverter cover and a state in which the resonance state is suppressed.

When resonating, the inverter cover 2 may cause a drumming phenomenon as illustrated in the left diagram of FIG. 6, that is, the inverter cover 2 may vibrate (single vibration) in the thickness direction to generate noise, which is considered to impair the comfort of the automobile.

Therefore, the drive motor module 1 is configured to be able to solve such a problem and bring the inverter cover 2 into the state as illustrated in the right diagram of FIG. 6 (that is, the vibration in the thickness direction is suppressed). Hereinafter, this configuration and action will be described.

The vibration source when the inverter cover 2 resonates is not limited to the motor 20.

As illustrated in FIG. 4, the outer surface (front surface) 22 of the inverter cover 2 is divided into a first region AR1 and a second region AR2 in the X direction in plan view.

The first region AR1 and the second region AR2 are adjacent to each other in a substantially central portion (hereinafter, referred to as "central portion 23") of the inverter cover 2. Here, the "central portion 23" refers to a portion where the amplitude at the time of resonance is maximized or a portion where the amplitude is considered to be maximized in the inverter cover 2.

In the first region AR1, a plurality of first ribs 24 and a connecting portion 25 to which each first rib 24 is connected are provided so as to protrude in the +Z direction.

The plurality of first ribs 24 extend in the Y direction and are disposed in parallel to each other.

The plurality of first ribs 24 are disposed at intervals in the X direction. The intervals between the adjacent first ribs 24 may be the same or different. The plurality of first ribs 24 may have the same thickness or different thicknesses.

In the present embodiment, the number of the first ribs 24 is five. The five first ribs 24 are referred to as a first rib 24A, a first rib 24B, a first rib 24C, a first rib 24D, and a first rib 24E in order from the −X direction to the +X direction. Hereinafter, the first ribs 24 will be referred to as "first ribs 24A to 24E" when being distinguished, and the first ribs 24 will be simply referred to as "first ribs 24" when not being distinguished.

The number of the first ribs 24 disposed is 5 in the present embodiment, but is not limited thereto, and may be, for example, 2 to 4, or 6 or more.

One connecting portion 25 is disposed in the −Y direction with respect to each of the first ribs 24. The connecting portion 25 extends in a direction intersecting with the first rib 24, that is, in the X direction in the present embodiment. One end side (end portion located in the −Y direction) of each first rib 24 is integrally connected to the connecting portion 25. As a result, each of the first ribs 24 is coupled to each other via the connecting portion 25, and is reinforced.

A plurality of second ribs 26 are provided to protrude in the second region AR2.

The plurality of second ribs 26 extend radially starting from the first region AR1 side. In the present embodiment, the plurality of second ribs 26 extend radially starting from the middle (central portion) of the first rib 24A in the longitudinal direction. As a result, the respective second ribs 26 are in a state of being connected by the first ribs 24A, and are reinforced with each other.

In the present embodiment, the number of the second ribs 26 is five. The five second ribs 26 are referred to as a second rib 26A, a second rib 26B, a second rib 26C, a second rib 26D, and a second rib 26E in order in the clockwise direction. Hereinafter, the respective second ribs 26 will be referred to as "second ribs 26A to 26E" when being distinguished, and the respective second ribs 26 will be simply referred to as "second ribs 26" when not being distinguished.

The number of the second ribs 26 disposed is 5 in the present embodiment, but is not limited thereto, and may be, for example, 2 to 4, or 6 or more.

As described above, in the inverter cover 2, the plurality of first ribs 24 and the plurality of second ribs 26 are asymmetrically disposed. As a result, the resonance frequency (vibration frequency) greatly differs between the first region AR1 and the second region AR2, and thus, even if the vibration from the motor 20 is transmitted to the inverter cover 2, the resonance of the inverter cover 2 can be suppressed.

Various conditions of the first ribs 24 in the first region AR1 such as the number and positional relationship of the first ribs 24 and various conditions of the second ribs 26 in the second region AR2 such as the number and positional relationship of the second ribs 26 are designed in consideration of the relationship between the vibration transmitted to the inverter cover 2 and the outer shape, weight, and the like of the inverter cover 2.

As illustrated in FIG. 4, the connecting portion 25 is thicker, that is, wider than each of the first ribs 24 and each of the second ribs 26. As a result, the connecting portion 25 has higher rigidity than each of the first ribs 24 and each of the second ribs 26, and can increase the rigidity of the entire inverter cover 2. As a result, the inverter cover 2 becomes a member that can sufficiently withstand resonance (that is, vibration is sufficiently suppressed).

Figure 5:
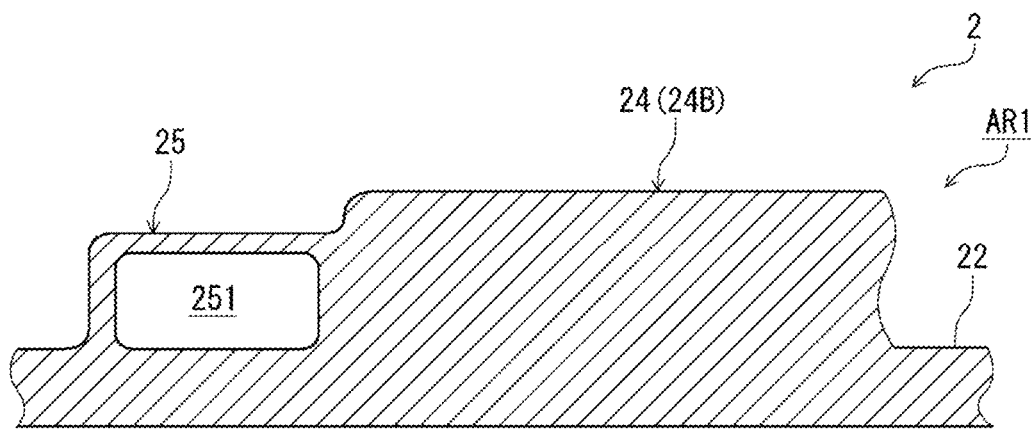
FIG. 5 is a sectional view taken along line C-C in FIG. 4.
Figure 5:
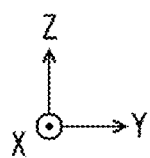

As illustrated in FIG. 5, the connecting portion 25 of the present embodiment has a hollow portion 251, and the hollow portion 251 is used as a flow path through which a refrigerant for cooling the motor 20, the inverter 80, and the like flows. The refrigerant is oil, and an upstream side or a downstream side of the hollow portion 251 is connected to the oil pump via, for example, a tube or the like.

Although the connecting portion 25 is hollow, the first rib 24 is solid. Similarly, the second rib 26 is solid.

The first rib 24 is preferably higher than the connecting portion 25 or equal to the connecting portion 25 in height. The second rib 26 preferably has the same height as the first rib 24. The heights of the first rib 24 and the second rib 26 are preferably, for example, 10 to 15 mm, and more preferably 12 to 15 mm. By appropriately selecting the heights of the first rib 24 and the second rib 26, the resonance suppressing function of the first rib 24 and the second rib 26 can be improved.

As illustrated in FIG. 4, each of the first ribs 24 has a different length (total length). In the present embodiment, the first rib 24C is the longest, the first rib 24A, the first rib 24B, and the first rib 24E are shortened in this order, and the first rib 24D is the shortest. Since the length of each of the first ribs 24 is different from each other, the resonance frequencies at the positions of each of the first ribs 24 are different from each other, so that vibration (that is, the drum phenomenon) of the entire inverter cover 2 is suppressed.

The widths of the first ribs 24 are substantially the same.

As illustrated in FIGS. 1 and 2, the first region AR1 and the second region AR2 are divided in a direction orthogonal to the motor axis J direction of the motor 20, that is, in the X direction. Of the first region AR1 and the second region AR2, the first region AR1 is located above the motor 20. Each of the first ribs 24 in the first region AR1 extends parallel to the motor axis J2 direction of the motor 20.

Therefore, each of the first ribs 24 is a portion extending in parallel to the motor axis J2 direction in the vicinity immediately above the motor 20. Thus, for example, when the vibration source when the inverter cover 2 resonates is mainly the motor 20, the vibration of the inverter cover 2 can be quickly suppressed by each first rib 24.

As illustrated in FIG. 4, each of the second ribs 26 radially extends starting from the first rib 24A located closest to the second region AR2 side among the plurality of first ribs 24. Among the first ribs 24A, it is preferable to start from the middle in the longitudinal direction of the first rib 24A (particularly, near the central portion), which is farthest from each coupling portion 21.

The middle of the first rib 24A in the longitudinal direction, which is the starting point of each of the second ribs 26, overlaps with the central portion 23 of the inverter cover 2. Therefore, each of the second ribs 26 can also be said to radially extend from the central portion 23 of the inverter cover 2.

With the arrangement of the starting points as described above, the vicinity of the central portion 23 of the inverter cover 2 is reinforced, and the rigidity is increased. When the inverter cover 2 resonates, the amplitude is maximized at the central portion 23 as described above, but since the vicinity of the central portion 23 has high rigidity, the amplitude at the central portion 23 can be further suppressed.

In addition, the angles formed by the adjacent second ribs 26 are different from each other. In the present embodiment, the angle between the second rib 26A and the second rib 26B is θ1, the angle between the second rib 26B and the second rib 26C is θ2, the angle between the second rib 26C and the second rib 26D is θ3, and the angle between the second rib 26D and the second rib 26E is θ4. Then, the angle θ3 is the largest, and then the angle θ4 and the angle θ1 decrease in this order, and the angle θ2 is the smallest. As a result, since the resonance frequencies at the positions of the respective second ribs 26 are different, vibration (that is, the drum phenomenon) of the entire inverter cover 2 is suppressed.

Furthermore, the positions of the branching points of the adjacent second ribs 26 are different from each other in the distance from the radial center (central portion 23). In the present embodiment, the distance between the second rib 26A, the second rib 26B, and the branching point is L1, the distance between the second rib 26B, the second rib 26C, and the branching point is L2, the distance between the second rib 26C, the second rib 26D, and the branching point is L3, and the distance between the second rib 26D, the second rib 26E, and the branching point is L4. Then, the distance L2 is the longest, then the distance L4 and the distance L1 are shortened in this order, and the distance L3 is the shortest. As a result, since the resonance frequencies at the positions of the second ribs 26 are greatly different together with the difference in the angle between the second ribs 26 described above, vibration (that is, the drum phenomenon) of the entire inverter cover 2 is further suppressed.

As described above, each coupling portion 21 is a portion to be screwed. Therefore, rigidity is high.

As illustrated in FIG. 4, among the second ribs 26A to 26E, the second rib 26A extends toward a coupling portion 21A and is connected via a block-shaped portion 27A. As a result, the second rib 26A is reinforced.

The second rib 26B extends toward a coupling portion 21B and is connected via a block-shaped portion 27B. As a result, the second rib 26B is reinforced.

As described above, since the second rib 26 is connected to the coupling portion 21 having high rigidity, the second rib 26 is reinforced, and as a result, vibration (that is, the drum phenomenon) is suppressed.

In the inverter cover 2, the area of the second region AR2 is larger than that of the first region AR1. As a result, the shape of the inverter cover 2 in plan view can be substantially "L-shaped".

Figure 7:
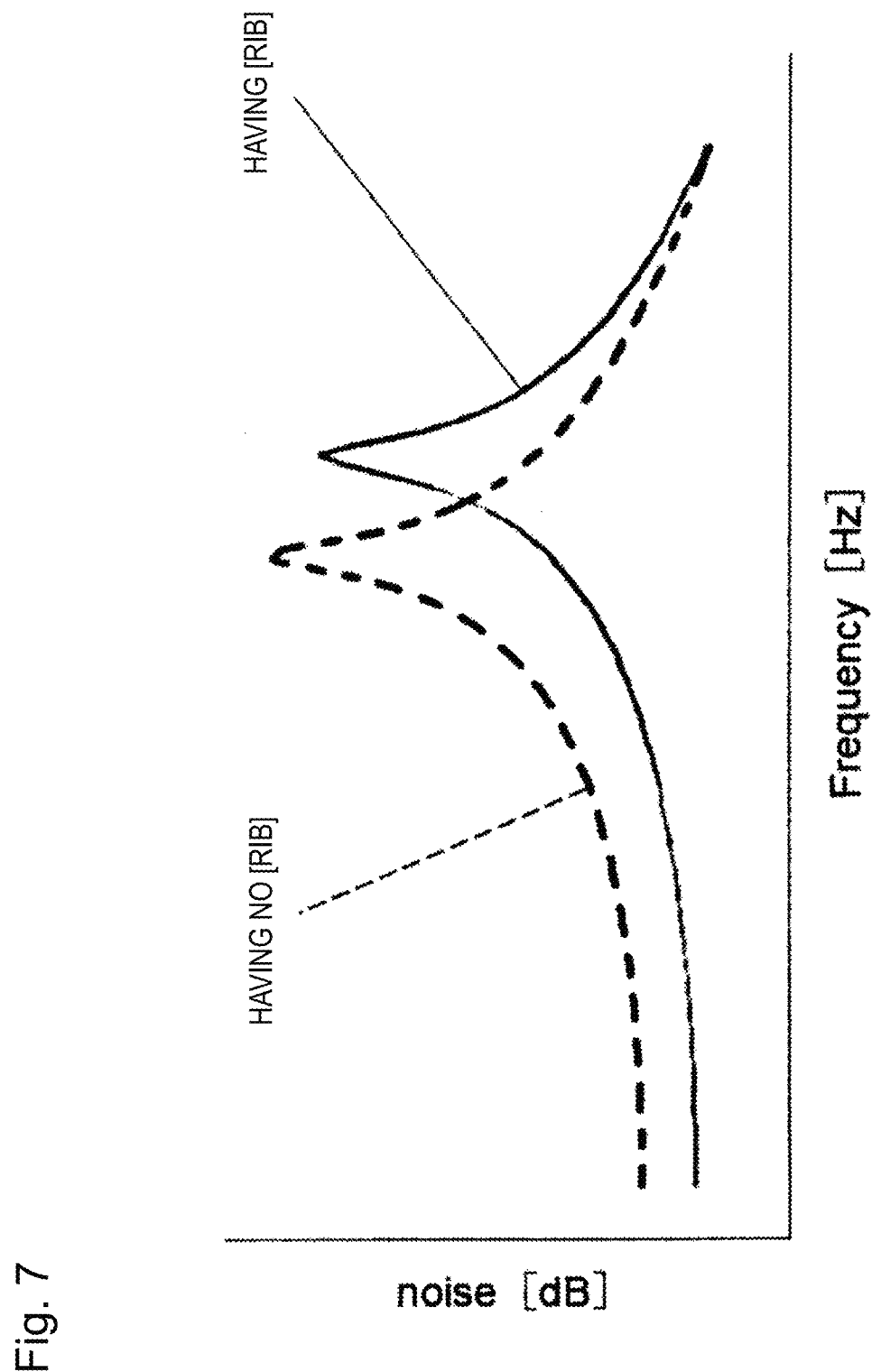
FIG. 7 is a graph illustrating a resonance state of the inverter cover and a state in which the resonance state is suppressed.

Comparing the case where the inverter cover 2 includes the first rib 24 and the second rib 26 with the case where the inverter cover 2 does not include the first rib 24 and the second rib 26, for example, the graph illustrated in FIG. 7 is obtained.

As is clear from FIG. 7, in the former case, the vibration frequency is shifted to the higher one, and the peak of the noise (vibration level) is also decreased.

Although the drive motor module of the present invention is described above with reference to the illustrated embodiment, the present invention is not limited thereto, and each unit constituting the drive motor module can be replaced with a unit having any configuration capable of exhibiting similar functions. Further, any component may be added.

Further, the outer surface 22 of the inverter cover 2 is divided into two regions in the above embodiment, but is not limited thereto, and may be divided into three or more regions.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A drive motor module comprising:
a motor;
an inverter electrically connected to the motor;
a housing that houses the motor and the inverter; and
an inverter cover that has a plate shape and covers the inverter,
wherein
an outer surface of the inverter cover is divided into at least a first region and a second region in plan view,
a plurality of first ribs arranged in parallel to each other and a connecting portion extending in a direction intersecting with the first ribs and connected to one end side of each of the first ribs are provided in a protruding manner in the first region, and
a plurality of second ribs that radially extend are provided in a protruding manner in the second region, wherein the connecting portion has higher rigidity than each of the first ribs and each of the second ribs.

2. The drive motor module according to claim 1, wherein the connecting portion is thicker than each of the first ribs and each of the second ribs.

3. The drive motor module according to claim 1, wherein the connecting portion has a hollow portion through which a refrigerant flows.

4. The drive motor module according to claim 1, wherein each of the first ribs has a different length.

5. The drive motor module according to claim 1, wherein each of the first ribs extends parallel to an axial direction of the motor.

6. The drive motor module according to claim 1, wherein the first region and the second region are divided in a direction orthogonal to the axial direction of the motor.

7. The drive motor module according to claim 1, wherein the first region is located above the motor.

8. The drive motor module according to claim 1, wherein
the first region and the second region are adjacent to each other in a central portion of the inverter cover, and
each of the second ribs extends radially from a central portion of the inverter cover.

9. The drive motor module according to claim 1, wherein each of the second ribs extends radially starting from a first rib located closest to the second region among the plurality of first ribs.

10. The drive motor module according to claim 9, wherein each of the second ribs extends radially starting from a middle in a longitudinal direction of a first rib located closest to the second region.

11. The drive motor module according to claim 1, wherein
at least three of the second ribs are disposed so that angles formed by the second ribs adjacent to each other are different from each other.

12. The drive motor module according to claim 1, wherein
at least three of the second ribs are disposed so that positions of branching points of the second ribs adjacent to each other are different from each other in distance from the radial center.

13. The drive motor module according to claim 1, wherein
the inverter cover has a coupling portion coupled to the housing at an edge portion of the inverter cover, and
at least one of the plurality of second ribs extends to the coupling portion.

14. The drive motor module according to claim 1, wherein
the first region and the second region are adjacent to each other in a central portion of the inverter cover, and
the second region is larger in area than the first region.

* * * * *